UNITED STATES PATENT OFFICE.

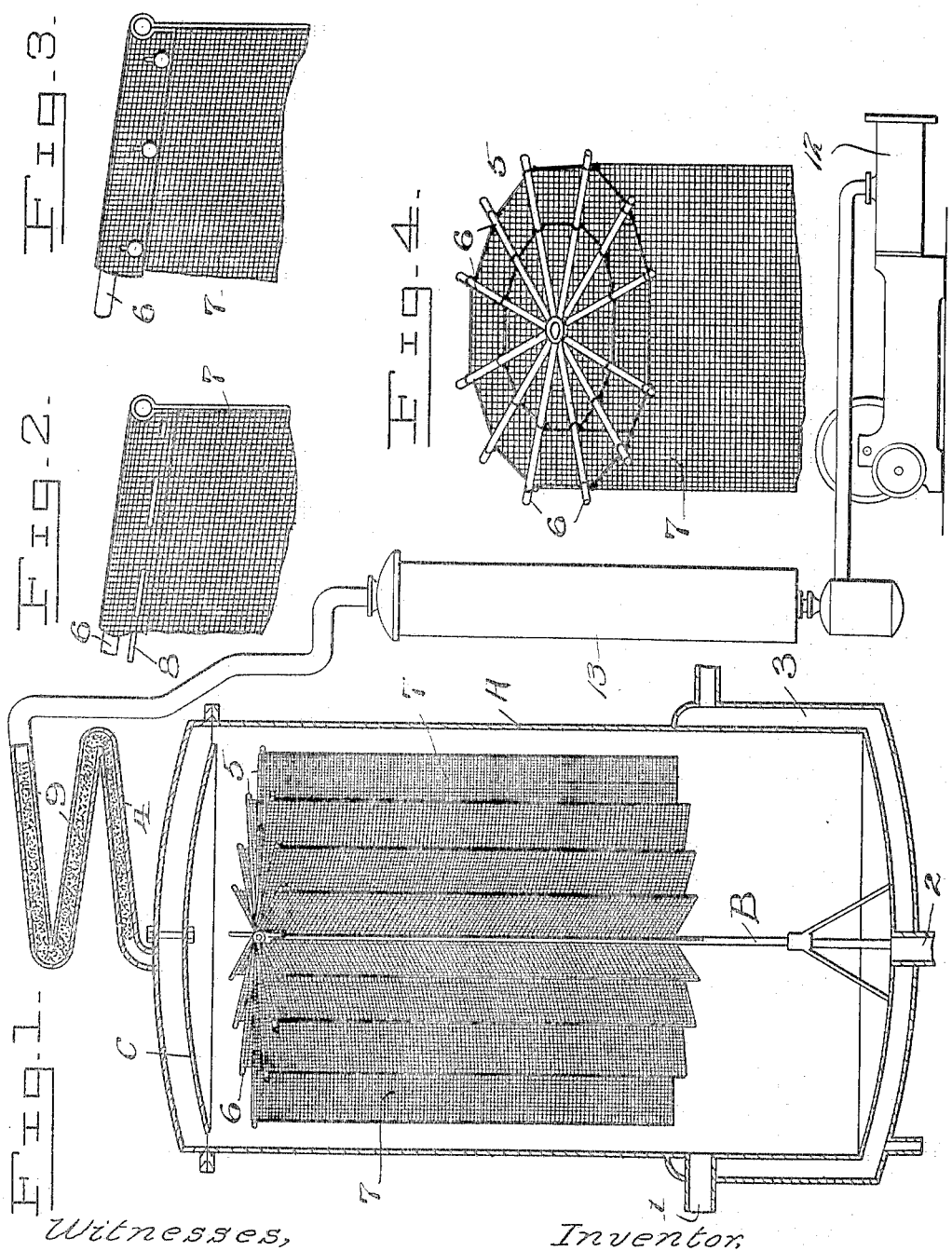

CHARLES R. HARRIS, OF LOS ANGELES, CALIFORNIA.

EVAPORATING APPARATUS.

1,258,563.     Specification of Letters Patent.     Patented Mar. 5, 1918.

Application filed May 4, 1917. Serial No. 166,451.

*To all whom it may concern:*

Be it known that I, CHARLES R. HARRIS, a citizen of the United States, residing at Los Angeles, in the county of Los Angeles and State of California, have invented certain new and useful Improvements in Evaporating Apparatus, of which the following is a specification.

My invention relates to an evaporating apparatus and appertains to that type of an apparatus for dealcoholizing, condensing, evaporating or distilling liquids such as beer, ale and the like.

One object of the invention is to provide an apparatus so arranged as to reduce foam of the liquid while undergoing ebullition and thus prevent the liquid from passing out of the apparatus.

A further object is to provide a means for retarding the excess moisture of the vapors for primary drying of the alcohol for filtering out the entrained water and passing the latter back into the container.

Figure 1 is a vertical section through the apparatus.

Figs. 2 and 3 are fragmentary views showing different methods of applying the evaporating members to their support.

Fig. 4 is a fragmentary view showing a modified form of suitable means for suspending the evaporating members.

A is a container of suitable design to meet the requirements of my invention. The lower end of this chamber is provided with the usual inlet 1 and outlet 2 for the beer or other liquid undergoing treatment to be dealcoholized, condensed, evaporated or distilled. The lower end of the chamber is provided with a water-jacket 3, as indicated in Fig. 1, for heating the liquid under treatment. It is obvious, however, any suitable means may be provided for heating the same. Connected to the upper end of the container is an inclined outlet 4, which is connected to the vacuum producing device 12 thereby causing the contents to be delivered into a container 13. Centrally located in the container is a vertically arranged tripod or support B. This support is provided at its upper end with a spider, or frame 5 which consists preferably of a plurality of radially arranged supports or arms 6. Hung from the spider 5 are a plurality of evaporating surfaces 7. These surfaces are adapted to extend vertically in the upper part of the container to assist in arresting and retarding the egress of the more or less heavy vapors arising from the liquid under treatment. These evaporating surfaces may be fastened upon the rods in any convenient way, as for instance, as shown in Fig. 2, the material is lapped over the supporting arms and a small rod 8 is interwoven through the fabric, thereby forming a loop at the upper end thereof. As shown in a modified form in Fig. 3, the evaporating surface or fabric may be lapped over the support 6, the free end of which is provided with button-holes and adapted to receive buttons suitably secured to the fabric, thereby forming the lap which is adapted to surround the support 6. Mounted over the evaporating surfaces is a baffle plate C which is of a sufficient diameter to close the upper portion of the container, leaving sufficient space around the edge, however, for an escapement of the vapors. This baffle plate acts also to retard and deflect back into the container, all excessive moisture passing off with the vapors, furthermore, the entrained vapors falling back from the inclined outlet 4 upon the convex baffle plate C, are directed beyond the evaporating strip toward the wall portions of the tank, thence to the lower part thereof.

When the apparatus is in use the vapors arising from the boiling liquid are retarded more or less by passing through the vertically arranged evaporating surfaces, whereupon the vapors come in contact with the convex baffle plate, which in turn has a tendency to deflect the excessive moisture back into the container, after which the vapors through the medium of a partial vacuum applied to a container through the inclined outlet 4, are drawn off into the container 13. This outlet is provided with a suitable filtering material 9, for entraining the excess vapors as they pass to the container 13 whereupon the vapors fall back upon the baffle plate, thence to the lower part of the tank, the baffle plate being of sufficient diameter to cause the vapors to clear the vertically arranged evaporating strips.

I claim:

1. An evaporating apparatus comprising an evaporating tank, an upwardly convex baffle plate arranged near the roof thereof, and an inclined outlet arranged centrally of the tank directly above the convex baffle plate, said outlet being filled with vapor filtering means, said inclined outlet serving to direct condensed vapors upon the convex diaphragm from which they are directed to the outer edge of the tank.

2. An evaporating apparatus comprising an evaporating tank, a plurality of vertically arranged evaporating surfaces centrally supported within the upper part of the tank, an inclined outlet arranged centrally of the tank directly above the evaporating surfaces, and an upwardly convex baffle plate interposed between the upper end of the evaporating surfaces and the inclined outlet, the said baffle plate being of greater width than the vertically arranged evaporating surfaces whereby the entrained vapors falling from the outlet are directed beyond the evaporating surfaces.

3. An evaporating apparatus comprising a tank adapted to contain a liquid treated and provided with an inlet and outlet at the lower portion thereof, a frame consisting of a plurality of radial arms centrally supported within the upper part of the container, evaporating surfaces vertically supported on said arms, an inclined outlet arranged centrally of the tank directly above the evaporating surfaces, and an upwardly convex baffle plate interposed between the upper end of the evaporating surfaces and the inclined outlet, the said baffle plate being of greater width than the vertically arranged evaporating surfaces whereby the entrained vapors falling from the outlet are directed beyond the evaporating surfaces.

In testimony whereof I affix my signature.

CHARLES R. HARRIS.